United States Patent [19]

Harju et al.

[11] Patent Number: 4,482,643
[45] Date of Patent: Nov. 13, 1984

[54] PREPARATION OF CRYSTALLINE TiO₂ AS ANATASE AND/OR RUTILE IN POROUS CARRIERS

[75] Inventors: Philip H. Harju, Spring Church; Kenneth R. Call, Pittsburgh, both of Pa.

[73] Assignee: Koppers Company, Inc., Pittsburgh, Pa.

[21] Appl. No.: 401,829

[22] Filed: Jul. 26, 1982

[51] Int. Cl.³ .................... B01J 21/06; B01J 21/08
[52] U.S. Cl. .................................. 502/242; 502/350; 502/351
[58] Field of Search ................... 252/454, 461, 463; 502/242, 350, 351

[56] References Cited

U.S. PATENT DOCUMENTS 3,565,919  2/1971  Friedrichsen et al. ......... 252/461 X
4,178,270  12/1979  Fujita et al. .................... 252/463 X
4,196,101  4/1980  Wilson et al. ................... 252/463 X

*Primary Examiner*—W. J. Shine
*Attorney, Agent, or Firm*—Daniel J. Long; Herbert J. Zeh, Jr.

[57] ABSTRACT

The invention discloses a method of impregnating a porous catalyst carrier with a partially hydrolyzed aqueous methanol solution of titanium tetrachloride, and completing the hydrolysis to titanium dioxide under controlled conditions of temperature and by-product removal to obtain the desired anatase, rutile or combination anatase/rutile polymorphic form of titanium dioxide.

13 Claims, No Drawings

PREPARATION OF CRYSTALLINE TiO₂ AS ANATASE AND/OR RUTILE IN POROUS CARRIERS

BACKGROUND OF THE INVENTION

1. Field of the Invention

This invention relates generally to the production of titanium dioxide on a porous catalyst carrier and more particularly to the control of the polymorphic form of titanium dioxide on said carrier.

2. Prior Art

Titanium dioxide can exist in three polymorphic forms: anatase, brookite and rutile. Brookite is found rarely as natural single crystals and has been prepared synthetically. Anatase and rutile appear naturally and are also produced commercially. In commercial production the formation of the particular crystal species is controlled by the manufacturing process. Anatase and rutile can best be distinguished by X-ray diffraction as known to those skilled in the art.

Titanium dioxide has been used as a carrier, a coating for a carrier, or a co-catalyst for oxidation and as a catalyst for other reactions. Differences have appeared concerning the desirability of the anatase or rutile form for such reactions.

The titanium dioxide is generally prepared commercially by hydrolytic precipitation from solutions of titanium sulfate or vapor phase oxidation of titanium tetrachloride. Normally, hydrolysis from sulfate solutions yields the anatase form and hydrolysis from chloride solutions (sulfate free) yields the rutile form. These normal products can be reversed in either case by special techniques such as, for example, seeding with nuclei of the other form or by addition of chemical additives. However, the commercial products generally have crystal sizes too large to permit impregnation of usual porous carriers.

Titanium tetrachloride is preferred as the starting material for the production of titanium dioxide in accordance with this invention because if titanium sulfate is the starting material, the sulfuric acid by-product would need to be removed by washing while the HCl by-product of titanium tetrachloride hydrolysis is volatile. The saving of one step in preparation with no possible sulfate contamination seems desirable. The general overall reaction is as follows:

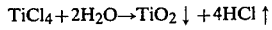

$$TiCl_4 + 2H_2O \rightarrow TiO_2 \downarrow + 4HCl \uparrow$$

A porous carrier in a catalytic system is a relatively inert material that serves as a support for the active catalyst. The functions of a carrier with respect to any catalyst, however, varies with the individual case. The carrier in many instances has an extremely great influence upon the activity and selectivity of the catalytic salts which it supports.

In a fluid bed catalytic system, as an example, the carrier plays several roles. The carrier must have the properties of good fluidization and heat-transfer after the catalytically active salts are added to the carrier. The characteristics of the carrier may also affect either the chemistry of the active salt disposition or the activity and selectivity of the final catalyst in an unknown fashion. Thus an a priori method of carrier selection is not available for these latter effects. The carrier in accordance with this invention is impregnated with the titanium dioxide and, if desired, can be further impregnated with the other catalytic salts.

The making of carriers that include crystalline titanium dioxide in the anatase form for oxidation catalysts, either alone or as a co-catalyst, is known. Generally, the processes for making TiO₂ carriers have depended upon the titanium dioxide being in the desired crystalline form as the initial starting material. U.S. Pat. No. 3,565,919, however, discloses that impregnating a carrier with an aqueous methanol solution of titanium tetrachloride and heating the product in the presence of oxygen at 130° C. to 600° C. thereby converted the titanium compound into the anatase form, and when a rutile/anatase form was desired as in Example I of the patent, titanium dioxide in the rutile form was used as the carrier. In working with xerogels made from various aqueous alcoholic titanium tetrachloride solutions, M. Vallet Regi et al. reported, in *Anales De Quimica*, Vol. 76, pages 172 et seq., that the gels which are prepared from titanium alcoholates are amorphous at room temperature, start to transform to anatase at 200° C. and to the rutile form at 600° C. and the specific alcohol being used to prepare the xerogel seemingly influences the gel's behaviour during thermal decomposition.

SUMMARY OF THE INVENTION

This invention provides a method for impregnating a porous carrier with a partially hydrolyzed titanium solution and thereafter obtaining the crystalline titanium dioxide in either the desired anatase or rutile form or with any desired proportion of the two forms. The selected polymorphic form or forms of titanium dioxide is formed in situ in the carrier. No adhesive diluent, binder, or other coating agent is required to adhere the titanium dioxide to the carrier; thus, the titanium dioxide forms in the pores of the carrier and is directly on and is in material contact with the carrier.

In accordance with this invention a carrier for the catalyst is impregnated with a partially hydrolyzed solution of titanium tetrachloride in aqueous methanol solution, then the solution is hydrolyzed on the carrier at a controlled rate of hydrolysis while removing the by-products at a controlled rate. Conveniently, the rate of removal of the by-products is controlled by sparging the mass with a gas sparge.

In accordance with this invention, it has been found that:

A. the % anatase form is increased when
  a. the rate of hydrolysis is reduced, and
  b. the rate of removal of by-products is accelerated, and contrarily B. the % rutile form is increased when
  a. the rate of hydrolysis in increased, and
  b. the rate of removal of by-products is reduced.

The by-products comprise water, methanol, and HCl.

DETAILED DESCRIPTION

Many catalysts are those in which the active catalytic salts are "supported", primarily inside the pore structure when the carrier is porous. They are made by impregnating the carrier with a solution containing catalytic salts, subsequently distilling off the solvent and calcining to produce the desired catalyst. Depending upon the use to be made of the catalysts, the volume of this impregnating solution may be critical. For example, it may be desirable that the volume of the impregnation salts be not greater than the pore volume of the carrier or the catalytic salt crystals may line the outside surfaces and give an undesired characteristic. The particular volume of impregnate to be used is readily determined by one skilled in the art. In accordance with the preferred embodiment of the invention, the pores of a silica gel carrier are coated with titanium dioxide.

Titanium tetrachloride for use in this invention is readily available commercially. Partially hydrolyzed solutions of titanium tetrachloride as precusors for the titanium dioxide in this invention can be prepared by the dropwise addition of TiCl$_4$ to cold, stirred solutions of methanol and water. These solutions most likely contain the species TiCl$_x$(OH)$_y$ or possibly TiCl$_x$(OH)$_y$(OCH$_3$)$_z$ where $x+y=4$ or $x+y+z=4$. The concentration of Ti in the solution is preferably about 4.3 moles/liter. The solutions are warmed to room temperature before impregnating the carrier.

To prepare the partially hydrolyzed aqueous methanol solution as a precursor for the titanium dioxide in the Examples which follows, a typical procedure is that 352.5 milliliters of methanol and 1057.5 grams of ice are charged to a 5-liter flask that is fitted with a stirrer, a thermometer well with a take off for gases and a dropping funnel. The flask is immersed in an ice-salt mixture. Then 877.5 milliliters of titanium tetrachloride is added dropwise over a period of hours during which time the temperature of the solution is usually kept below 10° C. This yields about 1890 milliliters of titanium solution.

In the preferred method of impregnation of the carrier, the partially hydrolyzed solution of TiCl$_4$ is slowly added at room temperature to the top of the silica gel which is being tumbled in a rotating flask. The solutions are added to the carrier in quantities such as partially to fill the pore space of the carrier and preferably such that 80-100% of the solution is in the pore space and 0-20% of the solution is exterior to the pores. After addition is complete, mixing continues for about one-half hour. As a practical procedure, the batch of titanium solution described above (about 1890 milliliters) can be mixed with 1280 grams of silica gel (Davison Grade 56) in a 5-gallon pail. Thereafter, the impregnated carrier is heated, conveniently in an oil bath, to bring about the complete hydrolysis of the titanium in the solution to TiO$_2$ and precipitation of the TiO$_2$. This is an important step in the formation of the desired form of the titanium dioxide—anatase and/or rutile. The oil bath temperatures range from about 110° C. to about 150° C. At lower temperatures, removal of by-products is difficult and at higher temperatures the control of the % anatase becomes more difficult. Under these conditions, the mix temperature is generally well below 100° C. for the first 40-20 minutes.

The material is then calcined at 400° C. In this stage the last traces of water and any other volatile matter were driven from the already crystalline TiO$_2$. During the calcination, some increase in crystallinity occurs as shown by the peak sharpening in the x-ray diffraction pattern. This high temperature calcination does not alter the form of TiO$_2$ which was produced at the lower temperature but does appear to fix the existing crystals of TiO$_2$ in a form resistant to leaching and perhaps with better crystallinity.

It has been discovered that the rate of removal of by-products during a low temperature heating is the determining factor whether anatase and/or rutile is formed. This finding was unexpected because the presence of oxygen (conveniently air) had heretofore been considered necessary for the production of the anatase form. According to this invention it has been found that 100% anatase is formed at very high rates of removal of by-products while 100% rutile is formed at very low rates of removal of by-products. At intermediate rates of removal of by-products, mixtures of anatase and rutile are formed in a controlled fashion by controlling the formation conditions.

The by-products removed during the heating step consist of at least water, methanol, and hydrogen chloride. While not wishing to be bound to a specific explanation, it is postulated that in the hydrolysis step HCl is formed as shown in the equation above. The HCl has a high solubility in the solution but the solubility is exceeded at some stage as the hydrolysis proceeds. This solubility is probably exceeded at a very early stage in the hydrolysis, and probably before the first crystals of TiO$_2$ begin to form. At this stage it now appears that rutile forms from the solution which is saturated or supersaturated with HCl. When the removal of HCl is accelerated to lower the concentration of HCl, it appears that anatase begins to form and to precipitate.

A convenient way to remove the by-products resulting from the hydrolysis of the titanium solution is to sparge the mass with gas during the heating step. The gas may conveniently be air or an inert gas such as nitrogen. The higher the rate of sparging gas, the higher the rate of removal of the by-products. It is important to have a high rate of sparge gas if anatase is the desired form. Table I shows the effect of rate of air sparge on production of anatase or rutile with impregnated (Davison Grade 56) silica gel in a rotating flask at a bath temperature of 150° C. Note that Example a gave 100% rutile in the presence of a considerable quantity of air. In this Table and all other Tables herein the sparge rate is expressed as the liter of gas per minute per liter of titanium solution used with the base carrier.

TABLE I

| Example | Sparge Rate | % Anatase | % Rutile |
|---|---|---|---|
| a | 11 | 0 | 100 |
| b | 21 | 58 | 42 |
| c | 22 | 54 | 46 |
| d | 48 | 75 | 25 |
| e | 51 | 85 | 15 |
| f | 58 | 100 | 0 |

The heating period for Examples b and c was interrupted periodically. This produced a higher % anatase than could be obtained in an uninterrupted heating at the same sparge rate.

Table II shows the effect of temperature (i.e., rate of hydrolysis) on the form of titanium dioxide which is produced, i.e., the effect of temperature (rate of hydrolysis) on the production of anatase or rutile with impregnated (Davison Grade 952) silica gel in the rotating flask at a constant sparge rate of 53. The lower bath temperatures provided slower rates of hydrolysis because of a lower rate of heat transfer through the walls of the flask. Also, water and methanol were removed slower at the lower temperatures.

TABLE II

| | 10-30 Min. After Immersion | | | |
|---|---|---|---|---|
| Example | Mix Temp. (°C.) | Bath Temp. (°C.) | % Anatase | % Rutile |
| g | 95-100 | 142-150 | 53 | 47 |
| h | 87-98 | 123-130 | 83 | 17 |
| i | 85-91 | 113-117 | 85 | 15 |

The combined effects, illustrated in Tables I and II, are demonstrated in another way to give a carrier with 100% anatase. After impregnation of the carrier a damp mix similar to that used for Examples a-f, was spread in a shallow, uncovered tray on a steam bath where the steam was at a temperature of about 100° C. Although this method provides a variable mix temperature at any time, temperatures in the region of 75°-85° C. appear to be valid. After 87 minutes, the mix was a white powder. This was then placed in the rotating flask and further heated at the bath temperature of 150° C. with an air sparge of 4.2. Without the steam bath treatment, it is theorized that the preparation would have given 100% rutile at the temperature and sparge rate used. This illustrates the lower rate of hydrolysis on the steam bath coupled with a high rate of by-product removal in a shallow layer exposed to the atmosphere to give the 100% anatase. Also, it shows the surprising discovery of this invention that high temperatures are not necessary for the production of the desired form of titanium dioxide.

Table III shows the effect of type of sparge gas on the production of either anatase or rutile with an initial bath temperature of 150° C. and a sparge rate of 21-22. In addition, a sparge rate of 11 was used during the 30 minute mix period. This initial sparge also increased the % anatase.

TABLE III

| Example | Sparge Gas | % Anatase | % Rutile |
|---|---|---|---|
| j | Air | 58 | 42 |
| k | Air | 54 | 46 |
| l | N₂ | 76 | 24 |
| m | Air[1] | 74 | 26 |

[1]Aspirator attached to the system

Oxygen, according to this invention, is not necessary for the production of anatase because the percent anatase was found to be higher with exposure to nitrogen as compared with a mixture of nitrogen and oxygen (air). Also, it was found that the use of an aspirator to help remove by-products improved the percent anatase with an air sparge, lending strong weight to the explanation that the absence of by-products (presumably HCl) rather than the presence of oxygen is the critical factor for formation of anatase.

Table IV shows times at which crystalline species of titanium dioxide have been detected during the hydrolysis and drying step and before calcination.

TABLE IV

| Example | Bath Temp. (°C.) | Sparge Rate | Time in Minutes After Immersion in Bath for Detection of Crystalline TiO$_2$ | Crystalline Form |
|---|---|---|---|---|
| n | 150 | 65 | 31 | Anatase |
| o | 130-140 | 2 | 55 | Rutile |
| p | 120 | 2 | 95 | Rutile |

Although no effort has been made to carry this table to its ultimate limit, it has been found that the crystalline forms are detectable at unexpectedly low temperatures. In each of the Examples in Table IV, continued heating at the given temperatures for longer times increased the peak heights of the X-ray diffraction patterns (i.e., increased the crystallinity). After calcination at 400° C. the peaks were sharpened even further and Example n was 100% anatase while Examples o and p were 100% rutile. It is quite evident that high temperatures are not necessary for the formation of crystalline titanium dioxide but are helpful in reducing the time necessary for preparation. Possibly the high temperatures increase crystallinity by removing some bound water that is only very slowly removed at the lower temperatures.

Two additional parameters have been found to affect the relative amounts of anatase and rutile which are formed. The first is a carrier particle size effect and is illustrated in Tables V and VI. Where a mixture of anatase and rutile exists, the larger particles of silica gel carrier have a larger percentage anatase than the smaller particles (Table V) screened after calcination, the sparge rate being 43. Most likely the larger particles have a slower rate of hydrolysis per volume of solution in the particle. This assumes a point to point contact for heat transfer and similar pore volumes (in cc/g) for large and small particles.

TABLE V

| Screened Fraction | Wt % of Sample | % Anatase | % Rutile |
|---|---|---|---|
| >149 um | 3.8 | 67 | 33 |
| 75-149 um | 37.2 | 64 | 36 |
| 54-75 um | 22.9 | 56 | 44 |
| 44-54 um | 14.3 | 49 | 51 |
| <44 um | 21.8 | 41 | 59 |
| Whole sample | 100 | 57 | 43 |

The particle size effect is also illustrated in another fashion in Table VI. A sample of the (Davison Grade 56) silica gel was screened to give a fraction with sizes between 105-250 um. This screened carrier was impregnated with titanium dioxide in a manner similar to Example a. The Example r with large particles of carrier gave 49% anatase while the preparation with the whole carrier, Example q, gave 100% rutile. More than one factor may be in operation with the large carrier particles to give the high percentage anatase at a low sparge rate. Very possibly there is less point to point contact with the large carrier particles of more uniform size than in a bed consisting of a wide variety of particle sizes. Thus heat transfer and the rate of hydrolysis was reduced. This is in addition to the previously mentioned factor of less heat input per volume of solution for the large particles. Another factor may be easier removal of by-products (more void space) in the bed of large carrier particles. Whatever the exact reason, it is clear that anatase is formed easier in the large carrier particles.

Table VI shows the carrier particle size effect on percent anatase and rutile formed with impregnated Davison Grade 56 silica gel.

TABLE VI

| | Example q | Example r |
|---|---|---|
| Carrier Particle Size (μm) | | |
| 149-250 | 20.3 wt % | 41.6 |
| 105-149 | 28.4 wt % | 58.4 |
| 74-105 | 20.0 wt % | 0 |
| 53-74 | 8.9 wt % | 0 |
| 44-53 | 7.1 wt % | 0 |
| <44 | 15.3 | 0 |
| Sparge Rate | 11 | 9.2 |
| % Anatase | 0 | 49 |
| % Rutile | 100 | 51 |

A final important factor helping to determine the relative anatase/rutile ratio is the mean pore diameter of the carrier. Table VII shows the effect of carrier pore size on the formation of anatase or rutile and that the use of a carrier with a large mean pore diameter gives anatase at very low sparge rates.

TABLE VII

| Example | Carrier Mean Pore Diameter (Å) | Sparge Rate | % Anatase | % Rutile |
|---|---|---|---|---|
| s | 210 | 11.0 | 0 | 100 |
| t | 850 | 1.5 | >80 | <20 |

In line with the prior explanation of rate of removal of by-products, the larger pores permit a faster escape of by-products.

In spite of the large number of variables that can affect the final form, it is simple to determine the parameters for each carrier. For example, in a system using a 2 liter rotating flask and an initial bath temperature of 150° C. and a 4.2 molar Ti solution, it has been determined that a high sparge rate of 58 liter air or higher of air per minute per liter of precursor solution used with the carrier gives 100% anatase with either the Davison Grade 56 or Grade 952 silica gel (both silica gels have similar particle size distribution and similar mean pore diameters). Low sparge rates of 10 or less produced 100% rutile. For other carriers or equipment conditions, the quantity of air or other sparge gas needed to produce 100% anatase could be readily determined by one skilled in the art. It should be noted that expressing the sparge rate per liter of impregnation solution irons out differences in the batch size and pore volume of the carrier.

In cases where it would be desirable to have both forms of titanium dioxide, the method of this invention can easily produce any desired ratio of anatase/rutile. With a given set of operating conditions the percent anatase is a linear function of the sparge rate when expressed as 1. air/(min)(1. of soln).

While the foregoing examples have utilized silica gel carriers, the invention is applicable to other general carriers such as diatomaceous earth (kieselguhr, etc.), pumice, alumina, kaolin, infusoria earth, aluminum silicate zeolites, magnesium silicate, and bauxite.

In Example u, kaolinite clay was impregnated with the partially hydrolyzed titanium solution and heated in the 150° C. oil bath with an air sparge rate of 19.5. The final calcined product had both anatase and rutile with the anatase form being the greater percentage. Interference from the diffraction peaks of the clay prevented the assignment of a number of the percent anatase.

What is claimed is:

1. A method of forming titanium dioxide in a selected polymorphic form or in a selected proportion of polymorphic forms on a porous carrier which comprises:
   impregnating a carrier with a partially hydrolyzed aqueous methanol solution of titanium tetrachloride and thereafter
   completing the hydrolysis of the titanium tetrachloride under controlled conditions to obtain a selected polymorphic form or a selected proportion or polymorphic forms of titanium dioxide, wherein the rate of hydrolysis is controlled such that low rates produce anatase and high rates produce rutile.

2. The process of claim 1 wherein the rate of hydrolysis is controlled by temperature.

3. A method of forming titanium dioxide in a selected polymorphic form or in a selected proportion of polymorphic forms on a porous carrier which comprises:
   impregnating a carrier with a partially hydrolyzed aqueous methanol solution of titanium tetrachloride and thereafter
   completing the hydrolysis of the titanium tetrachloride under controlled conditions to obtain a selected polymorphic form or a selected proportion of polymorphic forms of titanium dioxide wherein the by-products formed during the completion of the hydrolysis are removed at a controlled rate of high rates for anatase and of low rates for rutile.

4. The process of claim 3 wherein the by-products are removed by sparging the carrier mass with gas.

5. The process of claim 4 wherein the gas is air.

6. The process of claim 4 wherein the gas is an inert gas.

7. The process of claim 2 where the temperature of the heating medium is 110°–150° C.

8. The process of claim 1 where 80–100% of the solution is in the pore space.

9. The process of claim 1 wherein the partially hydrolyzed aqueous methanol solution is prepared by the slow addition of titanium tetrachloride into a cold stirred solution of methanol and water.

10. The process of claim 4 wherein the sparging gas is added at the rate of 0–100 liter of air per minute per liter of partially hydrolyzed aqueous alcoholic titnanium tetrachloride solution used with the carrier.

11. The process of claim 1 wherein the carrier is calcined after the completion of the hydrolysis to fix already existing crystals of the titanium dioxide in a form resistant to leaching.

12. The process of claim 1 wherein the carrier is silica gel.

13. The process of claim 3 wherein the carrier is calcined after the completion of the hydrolysis to fix already existing crystals of the titanium dioxide in a form resistant to leaching.

* * * * *